(12) United States Patent
D'Arcy et al.

(10) Patent No.: US 10,944,868 B2
(45) Date of Patent: Mar. 9, 2021

(54) CONTACT CENTER INTERFACES

(75) Inventors: Paul D'Arcy, Limerick (IE); Seamus Hayes, Longford (IE)

(73) Assignee: Avaya Inc., Basking Ridge, NJ (US)

( * ) Notice: Subject to any disclaimer, the term of this patent is extended or adjusted under 35 U.S.C. 154(b) by 1024 days.

(21) Appl. No.: 12/500,756

(22) Filed: Jul. 10, 2009

(65) Prior Publication Data
US 2011/0010382 A1    Jan. 13, 2011

(51) Int. Cl.
*G06F 16/00* (2019.01)
*H04M 3/51* (2006.01)
*H04M 3/523* (2006.01)
*G06F 16/903* (2019.01)
*G06F 16/9035* (2019.01)

(52) U.S. Cl.
CPC ...... *H04M 3/5166* (2013.01); *G06F 16/9035* (2019.01); *G06F 16/90335* (2019.01); *H04M 3/5233* (2013.01); *H04M 3/5191* (2013.01); *H04M 2203/2011* (2013.01)

(58) Field of Classification Search
None
See application file for complete search history.

(56) References Cited

U.S. PATENT DOCUMENTS

| | | | |
|---|---|---|---|
| 2002/0146668 A1* | 10/2002 | Burgin et al. | 434/118 |
| 2004/0139156 A1* | 7/2004 | Matthews | G06Q 30/01 709/204 |
| 2004/0249636 A1* | 12/2004 | Applebaum et al. | 704/231 |
| 2005/0141694 A1* | 6/2005 | Wengrovitz | 379/265.09 |
| 2007/0073719 A1* | 3/2007 | Ramer et al. | 707/10 |
| 2007/0185858 A1* | 8/2007 | Lu | G06F 17/30864 |
| 2008/0154933 A1* | 6/2008 | Galvin et al. | 707/102 |
| 2008/0288349 A1* | 11/2008 | Weisberg | G06F 17/30899 705/14.54 |
| 2009/0182810 A1* | 7/2009 | Higgins | G06Q 30/02 709/204 |

* cited by examiner

*Primary Examiner* — Anhtai V Tran

(57) ABSTRACT

A contact center interface is provided by co-operation between a search engine and a contact center. A search query entered by a user into the search engine is passed to the contact center and the contact center determines from the search terms an appropriate skillset to deal with that user query, returning to the search engine a link enabling the user to initiate a direct communications session to a live agent or queue having that skillset expertise, thereby bypassing interactive voice response sessions which are normally required to ascertain the nature of a query. By providing multiple search options to the user, the user is empowered to select the best skillset, and the accuracy of future searches can be improved.

26 Claims, 5 Drawing Sheets

---

ZRDmodems.com website search

Your search results on ZRDmodems.com

Device driver ZRD modem    62

64    Search now    66    60

Search results for "Device driver ZRD modem"

1. ZRD modem model 2194 product support
2. Troubeshooting.pdf
3. ZRD modem model 4194 product support
4. Driver download page: all modems
5. FAQ: Computer won't recognise modem

Live agent help:
Step 1: Decide on best topic
Step 2: Select video/voice/IM

1. ZRD Modems: software issues
Video    Voice    IM

2. ZRD Modems: hardware issues
Video    Voice    IM
68          70          72

3. Supported 3rd party modem issues
Video    Voice    IM

CONTACT CENTER INTERFACES

TECHNICAL FIELD

This invention relates to contact center interfaces.

BACKGROUND ART

Contact centers, also known as call centers, allow users (referred to herein interchangeably as "customers") to interact with or obtain assistance from human agents representing an organization.

The most common interface is the familiar telephone system. Customers wishing to speak to an agent dial a telephone number, and their call is processed at the contact center and allocated to one of a number of agents. Typically, the processing will involve determining the requirements of the customer, for example by characterizing the nature of the customer's query in terms of one or more "skillsets", and allocating the call to an agent who has expertise in the skillset(s) in question.

Determination of the appropriate skillset can be as simple as relying on the number which the customer dialed, e.g. if a contact center exposes different telephone numbers for different purposes. More commonly, the customer will traverse an interactive voice response (IVR) session in which responses to an automated script determine the appropriate skillset. Once the skillset requirements are known, the call is either allocated immediately to a suitable agent, if one is available, or is queued along with other waiting contacts until an agent becomes free.

The skilled person will be aware that there is a good deal of variation in how different contact center systems operate, and this brief overview is not intended to describe all of the varied functions which may be present in contact centers.

A difficulty with conventional technology is that the allocation of the customer's skillset is reliant on the accuracy of the outcome of the IVR session. Many calls are misdirected because the customer fails to hear a particular option, for example, pressing key "1" for personal banking services without waiting to hear that option "7" was for personal loans, in which the customer may have been interested. Some customers become impatient with IVR sessions and opt for whichever menu choice they believe most likely to put them in contact with a live agent as soon as possible.

The IVR script itself may be imperfect and the system designers may not have written it in such a way as to accurately capture the customer's intentions.

Furthermore, the designers of such systems are constrained by competing interests: to capture the skillset with as much granularity as possible, while also keeping the session short enough to prevent customer frustration.

This last problem is particularly acute in technical support contact centers, where a large number of agents may be trained to a high level, with each supporting a single product or a small family of products. Taking the example of a consumer electronics manufacturer, which supplies televisions, digital cameras, DVD players, hifi systems, mp3 players, car audio equipment, headphones, games consoles and fax machines, it may be next to impossible to correctly decide on the most suitable agent using a IVR menu system.

DISCLOSURE OF THE INVENTION

There is provided a computer-implemented method of providing a user with access to a resource of a contact center, comprising the steps of:

(a) providing a search engine interface to a user's computer system for searching documents on one or more websites;

(b) receiving a search query from the user's computer system via the interface;

(c) sending a request based on the search query to a computerized system of a contact center;

(d) receiving, in response to the request, data enabling a contact center link to be provided to the user, wherein the contact center link, when activated, initiates an interactive communications session between the user and a resource of the contact center; and (e) returning the contact center link to the user as part of a response to the search query.

Rather than relying on suppositions based on a structured IVR menu, this method involving a search engine allows a user to formulate a search query in the manner most familiar to users of the Internet. The search query is used to request data representing a link (or allowing a link to be constructed) from the contact center, and that resulting link can directly initiate an interactive communications session with a contact center resource.

The term "link" as used herein denotes an indicator of at least a network address which can be activated by a user to access a resource associated with the address. The term "link" is not used in the narrow sense of a hyperlink to a HTML webpage but in a broader sense which encompasses uniform resource indicators such as session initiation protocol (SIP) addresses, other telephony addresses and network destinations, and instant messaging addresses. Depending on the protocol with which the link conforms, the link may include, in addition to a simple network address, other parameters. SIP links, for example, can carry embedded parameters which are used by a SIP client application to augment the bare request for communication, and within the context of this method, may embed parameters passed to the contact center to ensure the request is queued or directed to the appropriate agent of the contact center.

Preferably, the method further includes the steps of conducting a search within the documents on one or more websites in response to the search query, and returning at least one document link to one of the documents as part of the response to the search query.

Preferably, the method further includes the step of formatting the response to the search query to display a first result set including the document link and a second result set including the contact center link.

Alternatively, the contact center link and document link may be presented as part of a common set of results.

Preferably, the method includes an additional initial step of determining, from the search query, the identity of a particular contact center (or more than one such contact center) to which the request should be sent.

Thus, a search query can be used to generate conventional search engine results, and a determination can be made as to whether the search query (or some terms in the query) have been flagged as being of interest to a contact center, the request can be sent to that contact center. Alternatively, if the search results return links to a site or business which is known to have an associated contact center, the request can be directed to that contact center. Contact centers can subscribe to be added to the records of the search engine, or the search engine may autonomously discover such contact centers.

The data received in step (d) may enable a plurality of contact center links to be provided to the user. In this way, the contact center identifies a plurality of potential links to be provided to the user, which allows the user to select the most appropriate such link.

The data received in step (d) may itself comprise the contact center link. Depending on the protocol agreed between the contact center and the search engine, it may make sense for the entirety of the link to be sent back by the contact center, including the URI for initiation of a communications session, and this URI may have embedded therein parameters passed to the contact center during that session, and also including a descriptor for actual display, such as a user-friendly description of the skillset selected in response to the search engine request.

Alternatively, the data received in step (d) may comprise an identifier of a link cached by the search engine. The contact center may supply in advance, or the search engine may generate in advance, a set of URIs which can be selected from a cache or memory for presentation to the user upon identification by the contact center.

The contact center link may be generated uniquely for the user, whereby activation of the link initiates an interactive communications session recognisable by the contact center as relating to the data sent in response to the original request from the search engine.

The unique link may be generated by including a unique ID in the data which is incorporated in the contact center link. That unique ID may be stored for later correlation between a communications session initiated by activating the link and the request based on the user's original search query.

The request sent to the contact center includes an identifier of the user, whereby a subsequent interactive communications session between the user and a resource of the contact center arising from initiation of the contact center link enables the contact center to associate the interactive communications session with the request from the search engine.

Optionally, the identifier of the user is a network address of the user. Thus, the search engine may pass the user's IP address with the request based on the search query, and this IP address may be recognized in a later communications session emanating from the address to provide a correlation between the communications session and the request from the search engine.

The contact center link when activated, may initiate an interactive communications session between the user and a predetermined agent of the contact center selected in response to the request.

Alternatively, the contact center link when activated, may initiate an interactive communications session between the user and a predetermined queue of agents of the contact center selected in response to the request.

Preferably, the contact center link is configured to initiate a communications session from a compatible communications application, if such application is available on the user's computer.

Accordingly, the link may be, for instance, a SIP URI which is interpreted by the user's computer to initiate a SIP session using a SIP client application resident on the computer.

Preferably, the communications application is a voice or video telephony application.

Alternatively, the communications application may be, for instance, an instant messaging (IM) application.

The communications application may be integrated with a browser employed by the user to access the search engine interface. Thus, the user, on clicking a link for, e.g. video chat with an agent, may be presented with a pane in the webpage in which the video communications session takes place.

The contact center link may contain parameters representing customer requirements which are passed to the contact center within an interactive communications session initiated on activation of the contact center link.

Preferably, the parameters are indicative of one or more skillset parameters employed by a management system of the contact center, whereby the communications session may be directly assigned to a skillset based on the parameters.

For example, the link may explicitly include an indication of skillset requirements which are sent as part of a SIP request to initiate a telephony session from the user's computer to the contact center, allowing the contact center to immediately place the call in an appropriate queue.

There is also provided a corresponding computer program product comprising a program carrier encoding instructions which, when executed by a search engine computer system, are effective to cause the search engine computer system to:

(a) provide a search engine interface to a user's computer system for searching documents on one or more websites;

(b) receive a search query from the user's computer system via the interface;

(c) send a request based on the search query to a computerized system of a contact center;

(d) receive, in response to the request, data enabling a contact center link to be provided to the user, wherein the contact center link, when activated, initiates an interactive communications session between the user and a resource of the contact center; and (e) return the contact center link to the user as part of a response to the search query.

There is also provided a computer-implemented search engine system providing a user with access to a resource of a contact center, comprising:

(a) a server for providing a search engine interface to a user's computer system for searching documents on one or more websites and receiving a search query from the user's computer system via the interface;

(b) an interface for providing communication with a computerized system of a contact center;

(c) a request generator for formulating a request based on the search query for sending to the computerized system of a contact center;

(d) a results generator for providing to the user a contact center link based on data received in response to the request, the contact center link being configured such that, when activated, it enables an interactive communications session between the user and a resource of the contact center.

In another aspect there is provided a computer-implemented method of providing a user with access to a resource of a contact center, comprising the steps of:

(a) receiving from a search engine a request based on a search query submitted to the search engine by a user's computer system;

(b) determining, from the request, the identity of at least one selected resource of the contact center based on stored rules;

(c) sending to the search engine, in response to the request, data enabling a contact center link to be provided to the user, whereby the contact center link, when activated, will initiate an interactive communications session between the user and the selected resource of the contact center;

(d) receiving, from the user, a communications session initiation from which the selected resource may be identified; and (e) directing the communications session to the selected resource.

In preferred instances, the method further includes the step, carried out after having received a communications session initiation from the user, of amending the stored rules.

In one scenario, the amendment of the stored rules confirms an association between the request received from the search engine and the resource identified in a contact center link activated by the user.

In another scenario, the amendment of the stored rules confirms an association between the request received from the search engine and a resource of the contact center which is different from that specified in a contact center link activated by the user but to which the user's communications session is ultimately directed.

Accordingly, after receiving a communications session from the user, the rules store may be improved with semantic knowledge gained about the accuracy of the original data sent to the user in response to the request, i.e. how accurate the rules were from the point of view of the user who selected one link from a number of options, or how accurate they were from the point of view of an agent, for example, who had to subsequently transfer the user to a better skillset.

A computer program product is also provided comprising a program carrier encoding instructions which, when executed by a computer system of a contact center, are effective to cause the computer system to:

(a) receive from a search engine a request based on a search query submitted to the search engine by a user's computer system;

(c) determine, from the request, the identity of at least one selected resource of the contact center based on stored rules;

(d) send to the search engine, in response to the request, data enabling a contact center link to be provided to the user, whereby the contact center link, when activated, will initiate an interactive communications session between the user and the selected resource of the contact center;

(e) receive, from the user, a communications session initiation from which the selected resource may be identified; and (f) direct the communications session to the selected resource.

There is also provided a computer-implemented contact center system for providing users with access to a resource of a contact center system, comprising (a) an interface for receiving from a search engine a request based on a search query submitted to the search engine by a user's computer system and for returning data to the search engine in response to the request;

(b) a storage area storing rules for determining, from the request, the identity of at least one selected resource of the contact center based on stored rules; and (c) processing means programmed to determine the identity of at least one selected resource of the contact center based on the stored rules and to generate data enabling a contact center link to be provided to the user, whereby the contact center link, when activated, will initiate an interactive communications session between the user and the selected resource of the contact center;

wherein the processor is operably connected to the interface to receive the request therefrom and to provide the data thereto.

BRIEF DESCRIPTION OF THE DRAWINGS

The invention will now be further illustrated by the following description of embodiments thereof, given by way of example only, with reference to the accompanying drawings, in which.

DETAILED DESCRIPTION OF PREFERRED EMBODIMENTS

Figure 1:
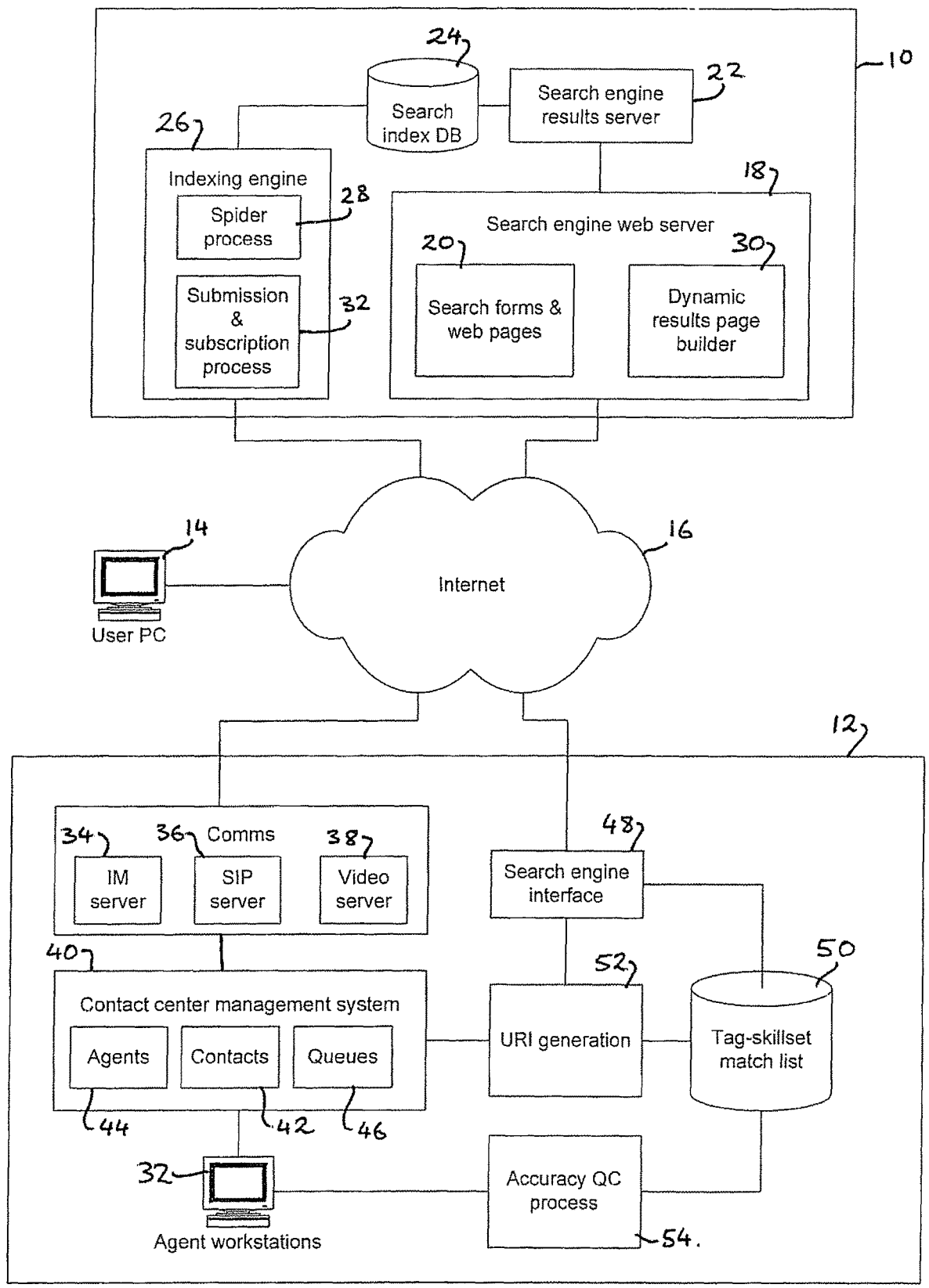
FIG. 1 is a network architecture including a search engine system and a contact center system.

FIG. 1 shows a network architecture including a search engine system 10, a contact center system 12 and a user's PC 14, all communicating via the Internet 16.

The search engine 10 includes a search engine web server 18 which hosts one or more search forms and/or web pages 20 accessible via the Internet 16 by user 14. In its most basic mode of operation, a search engine web server receives a search query from the user submitted via a web page. The search query is sent to a search engine results server 22 which consults a search index database 24 in which various documents have been indexed.

The indexed documents may relate to a single folder, to a single web site, to a small number of websites, to a local or wide area network, or in the case of a general search engine, to all publicly available documents hosted on the Internet 16. An indexing engine 26 operates a spider process which "crawls" through the folders, web pages, web sites or networks which it has been configured to search, indexing documents that are found thereon, and returning the results of such indexing to the search index database 24.

The search engine results server 22 retrieves from the database 24 a set of results matching the search query, and returns these to the search engine web server 18. A dynamic results page builder process or program 30 formats these results into a web page which is returned by the search engine web server 18 to the user's PC 14. Typically, the web page includes a list of links which the user can then click on or activate in some other way to access the resource associated with that link.

In addition to mere indexing of documents, many search engine provide submission and subscription processes 32 which can receive submissions of web pages and other resources which would not ordinarily be found by the spider process, which are subscription-only, or for which it is desired to pay a premium, e.g. by having one or more links appear in paid-for advertisements. The skilled person will be aware that there are many variants on the submission and subscription process, and normally this process interacts with billing systems, management systems and many other business processes which are not shown for simplicity.

The operation of the search engine 10 as described above is entirely conventional. The search engine may be a general purpose public search engine (such as the search engines available on www.google.com and www.yahoo.com), or it may be a search engine hosted on an organization's website, or indeed it may be a privately available search engine hosted on, for example, an Intranet.

The contact center 12 shown in FIG. 1 is, like the search engine 10, a simplified representation of a generic contact center and omits components and processes which are not relevant to the disclosure herein. The contact center 12 provides access between user PC 14 and one or more live agents situated at agent workstations 32 (only one of which is shown). Customers may also access the contact center using conventional telephone equipment, video calling equipment and software hosted on a computer providing such functions.

When a customer initiates an inbound communications session, such as a voice call, video call or instant messaging session, this is directed to the publicly advertised address or telephone number of the contact center. Such communications are directed to an appropriate communications server configured to handle such sessions, such as an IM server 34, a SIP server 36 (for handling Voice over Internet Protocol (VoIP) calls suing the SIP standard), or a video server 38. Other suitable types of communications servers and switches may of course be present as required.

Taking the example of an inbound call which is handled by SIP server 36, SIP server 36 notifies a contact center management system 40 of the arrival of the call, and contact center management system 40 creates a contact representing that call, which is managed along with all other contacts 42. The contact center management system 40 determines one or more skillsets which an agent may require to handle the call, and this is normally done using automated applications such as an IVR process (not shown).

Each agent who is currently active is represented by a set of agent resources 44, giving the contact center management system awareness of the current status (busy/idle) of the agent and the skillsets for which that agent is trained. If no suitable agent is currently available, then the contact is queued on one or more queues 46, also managed by the contact center management system.

Again, the operation of the contact center system 12, as thus far described, is entirely conventional and may be varied in accordance with prevailing standards and technology in any suitable manner to provide interactive communications between users (or customers) and agents.

Where the system of FIG. 1 differs from conventional technology is as follows. The contact center system is provided with a search engine interface 48 which is in communication over the Internet (or over any other network) with search engine results server 22. Search queries received at the search engine 10 are used to request links to resources from the search engine interface 48 of the contact center 12, in addition to (or even instead of) a conventional search in the search index database 24.

The configuration of the search engine to refer such search results to the contact center may result from an exclusive relationship between search engine 10 and contact center 12, or the search engine may be programmed to do this as a result of a submission made via the submission and subscription process, e.g. if the operator of the contact center notifies the search engine or pays for such referrals to be made.

The search engine interface 48 operates a process which consults a tag-skillset match list (or more generically, a set of stored rules for determining a resource of the contact center based on a received request) 50 in order to determine from the search engine request, an appropriate skillset of skillsets which might be relevant to that request.

The results of this matching are passed to a uniform resource indicator (URI) generation process 52 which generates data for creating one or more links to resources of the contact center which are considered to be equipped to handle the skillsets retrieved from tag-skillset match list 50.

These data are passed back via the search engine interface 48 to the search engine results server 22, so that the dynamic results page builder 30 can include links to the identified resources of the contact center along with any other links returned by the search engine results server 22.

If a user clicks such a contact center link, then a voice call, video call or IM session will be initiated directly from the user's PC 14 to the contact center, and this new communications session will include a notification of the associated skillset, or will inherently include some property which enables the contact center management system to derive the skillset identified in the creation of the data sent to the search engine. This allows the contact center to bypass the normal IVR session since the customer has, by clicking on the link, indicated the skillset to which the request should be directed.

A further process operating within the contact center of FIG. 1 is an accuracy quality control (QC) process 54. If the contact center search engine interface 48 returns several links (e.g. each to a different skillset, perhaps due to multiple matches between the search query terms and the skillset associations maintained in the tag-skillset match list), then the fact that the user clicks one of these links is an indication that that link is the most relevant in the view of the customer. This information can be sent to the quality control process 54 in order to update the tag-skillset matchlist 50 with the new intelligence gleaned from the fact that the customer, having submitted a particular search query, chose a particular one of the several returned links.

Figure 2:
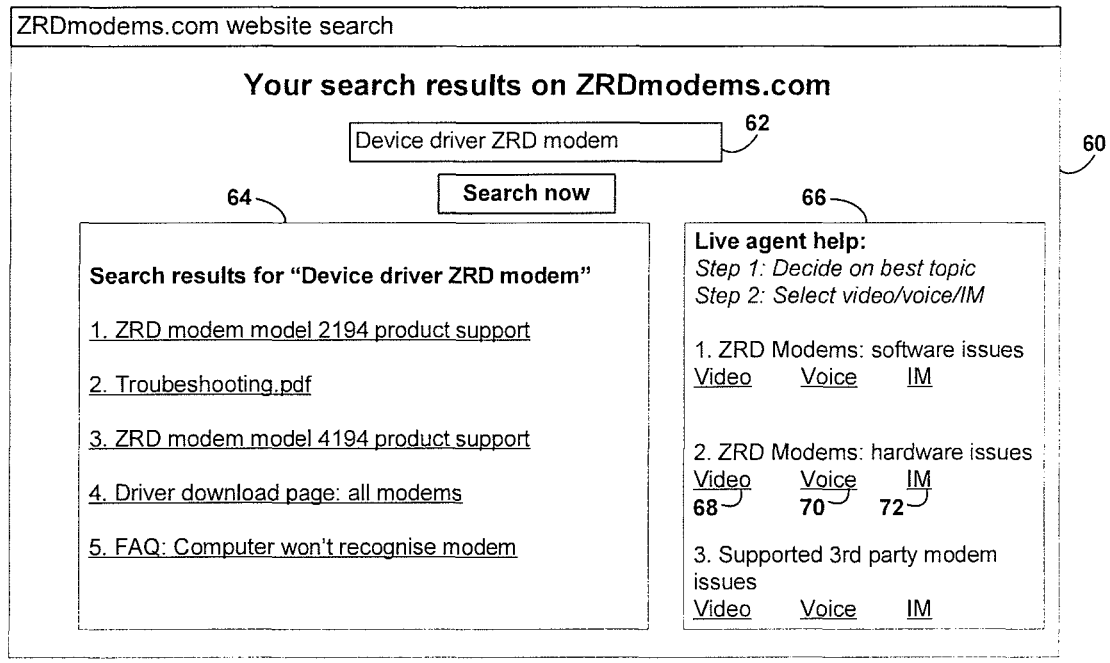
FIG. 2 is a simplified screenshot of a first search results page.

FIG. 2 shows an example simplified screen shot of a results page which might be returned to a user when search engine 10 is a company's own website search engine, i.e. it is configured to search internally within only the documents hosted on a fictional website called ZRDmodems.com.

The search results page 60 includes an indication of the search query 62 for which the user submitted a search (in this example the customer searched for the search terms "Device driver ZRD modem"). In response to this search, the search engine 10 has returned two sets of results. These results have been formatted by the dynamic results page builder 30 of FIG. 1 into two panes within the web page, a left-hand pane 64 containing links to documents based on the contents of the search index database 24, and a right-hand pane 66 containing contact center links formulated in response to the data returned from search engine interface 48 of contact center 12.

It can be seen that the links in the left-hand pane 64 (referred to herein generically as "document links"), provide a range of options for the user to select particular web pages or documents hosted on the site ZRDmodems.com, in which all of the search terms appear.

The right-hand pane, containing the contact center links, includes an indication of three different skillsets (namely "ZRDmodems: software issues", "ZRDmodems: hardware issues" and "supported third party modem issues"). For each of these three skillsets, there are three links which can be chosen by the user. Thus, if the user chooses the second topic as representing the best skillset, the user can then decide to click on a video link 68, a voice link 70 or an IM link 72. Clicking on any of these links will cause the user's computer system to launch an appropriate application (for example, a SIP client if the user clicks on voice link 70), with the parameters specified in the link being passed to that application so that the application automatically initiates a communications session of the specified type to a resource of the contact center specified in the link.

Providing an interface to the contact center in this way provides a number of advantages over conventional methods of accessing contact centers. Firstly, because the search query 62 is formulated by the user rather than by the contact center, there is a greater degree of freedom for the user to formulate and express his or her needs.

Secondly, the contact center is able to build up a rich and granular association between search terms and skillsets or other parameters for accessing resources.

Thirdly, the communications session initiated by the user can be tracked and a quality control analysis can be conducted, for example by agent feedback following completion of the session, to determine if the link or links provided were, in fact, appropriate to the search query, and the system can be continually improved by such feedback.

Fourthly, by providing a number of links, the user is empowered to choose the best skillset, and the contact center in turn can learn, from the skillset chosen, how to improve future results.

Figure 3:
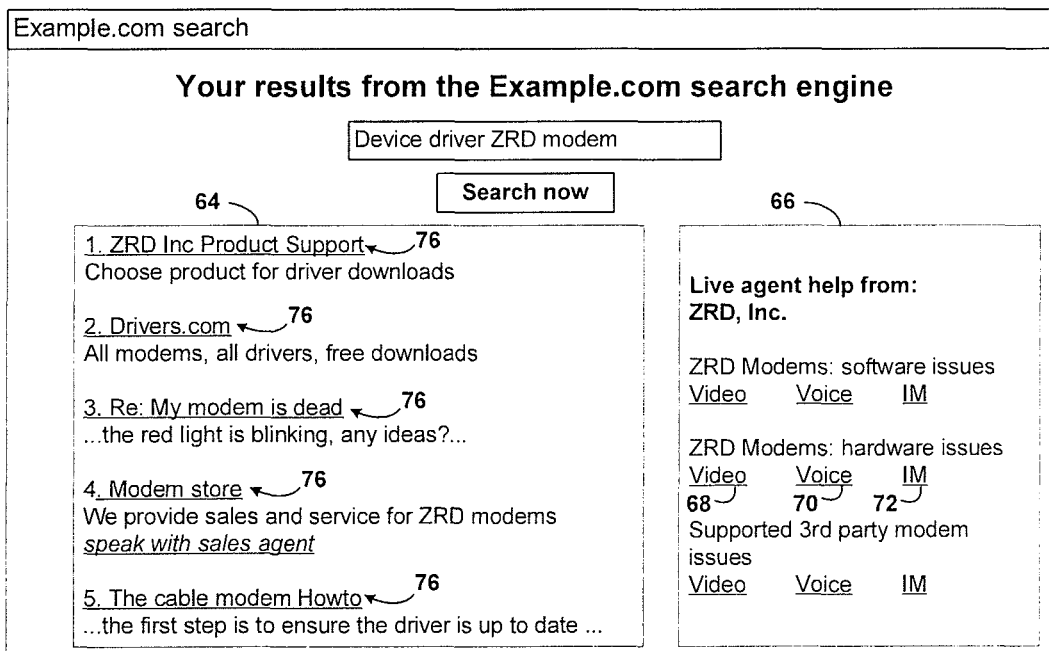
FIG. 3 is a simplified screenshot of a second results page.

FIG. 3 shows a corresponding screenshot of a web page 74 which may be provided by a third party's general purpose Internet search engine, which in this case is the fictional Example.com search engine.

As with the screenshot of FIG. 2, the search engine results page shows a search box 62 containing the same query, a left-hand results pane 64 containing a number of document and web page hits, a right-hand results pane 66 containing the same links as in FIG. 2, returned from the same contact center hosted by ZRD, and again the user has the option to select a skillset which is believed to best match the user's needs, and to select within that skillset a link for video 68, voice 70 and IM 72.

The left-hand results pane 64 includes a numbered series of primary links 76 which are links to documents and web pages found on the Internet, as well as an instance of a contact center link 78 associated with one of the businesses for whom a primary link was found. Accordingly, in addition to having the option to initiate a communications session with the contact center of ZRD, Inc., the user also has the option speak with a sales agent from one of the businesses selling the modems made by ZRD. Thus it can be seen that the search engine may send requests based on the search query to several different contact centers and may present the various contact center links, resulting from the data received back from those contact centers, in any number of ways.

The screenshots of FIGS. 2 and 3 represent a relatively bare search engine interface. As the skilled person will be aware, search engine interfaces can be embedded in an infinite number of web page designs and need not be confined to "pure search engines". In addition, the functionality of the search engine may be augmented in many different ways. To give one example, the Google search engine includes two buttons to initiate a search. Apart from the regular "search" button, there is also an option entitled "I'm feeling lucky" which can be selected by the user to directly return the top web page hit. In similar manner, a button could be provided entitled "Speak to live agent", which would function in an analogous manner to cause the search engine to firstly decide on the most appropriate contact center, secondly send a request based on the search query to that contact center, thirdly receive back data from the contact center representing a "click to talk link", and fourthly activate that link on behalf of a user to launch a voice communications session with the agent, resource or queue selected as appropriate by the contact center. From the user's viewpoint, selecting the "Speak to live agent" button would seamlessly result in a voice telephony session being launched to the most appropriate contact center and the most appropriate skillset.

Figure 4:
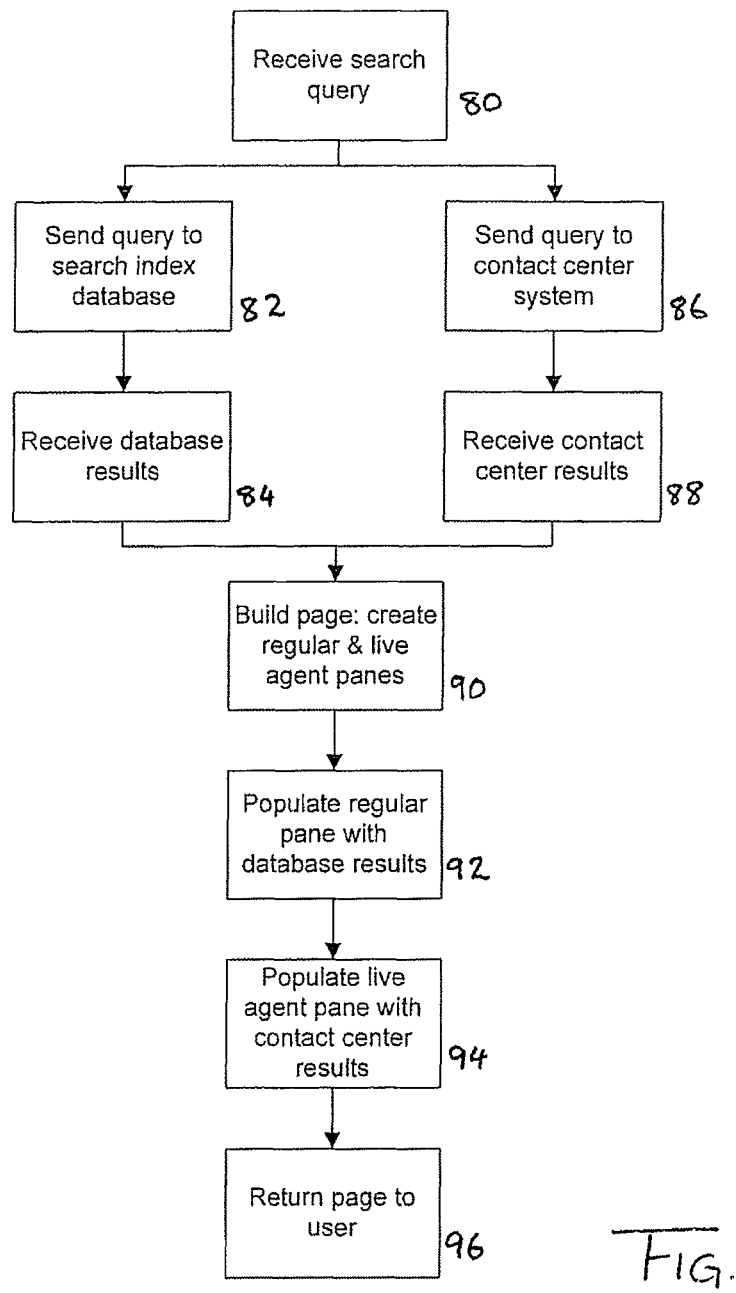
FIG. 4 is a flowchart of a method operating within a search engine.

FIG. 4 is a flowchart of the operation of a dedicated search engine associated with a contact center, such as that which gives rise to the screenshot of FIG. 2. The web server of the search engine receives a search query, step 80. Because the search engine is dedicated to a particular organization having a website and a contact center, the engine is configured to receive in parallel two sets of results.

Accordingly, in step 82, the query is sent to the search index database from which a set of database results are received, step 84. In parallel, a request based on the search query is sent to the contact center system 12, step 86, as described above, from which data representing the contact center results are received, step 88.

These two sets of results are provided to the dynamic web page builder which begins to build a page, step 90, by creating a regular search result pane and a live agent (or contact center) result pane. The building of the web page can begin before receiving back the respective sets of results, with the page loading on the user's browser as the results are received and populated into the respective panes. Thus, the page builder populates the regular pane with the database results, step 92, and populates the live agent pane with the contact center results or links, step 94. Finally, the completed page is returned to the user, step 96.

Figure 5:
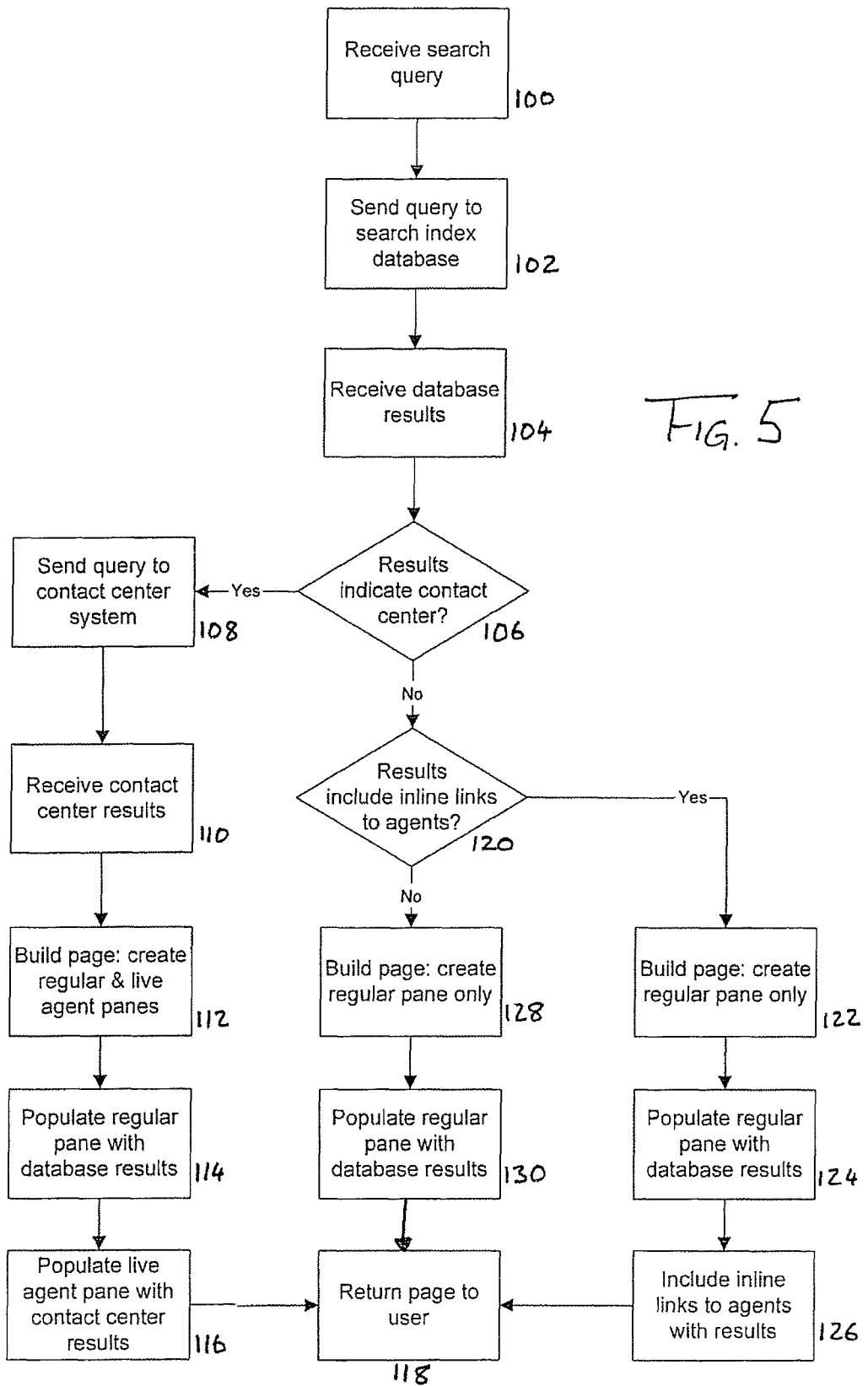
FIG. 5 is a flowchart of a method operating within a contact center system.

FIG. 5 shows a corresponding process operating on a third party, general purpose, search engine which is not directly associated with a particular contact center. The process begins in the same way, with the contact center receiving a search query, step 100, and sending this query to a search index database, step 102, from which database results are received, step 104.

In step 106, the results are evaluated to determine if there is an indication that the search query should also be referred to a contact center. If the outcome of this evaluation is positive, then a query is sent to the contact center system (or systems) indicated to be relevant, step 108. The search engine receives data from the contact center representing the contact center links or results, step 110, and then the dynamic web page builder operates in steps 112, 114, 116 and 118 to generate and return a results page to the user in precisely the same manner as in steps 90, 92, 94 and 96 of FIG. 4.

If the determination in decision 106 is negative, the results are then evaluated to determine if they include "inline links" to agents, decision 120. By "inline links" is meant that the search engine index database may include, for particular web pages or websites, static links providing direct communications access to a contact center. If such results are indexed, then these could be populated in a separate "live agent" pane, but in this example process they are not. Thus, if the determination step 120 is positive, the dynamic page builder builds a page, creating a regular pane only, step 122, and populates this pane with the database results indicative of document and web page links, step 124, as well as with the inline links to agents, which are included among the results in this regular pane, step 126, and the page is then returned to the user, step 118.

If the determinations in decisions 106 and 120 are both negative, such that no contact center links are indicated to be available or particularly relevant, the web page builder builds a web page creating a regular pane only, step 128, and populates this pane with the database results, step 130, before returning the page to the user, step 118.

Figure 6:
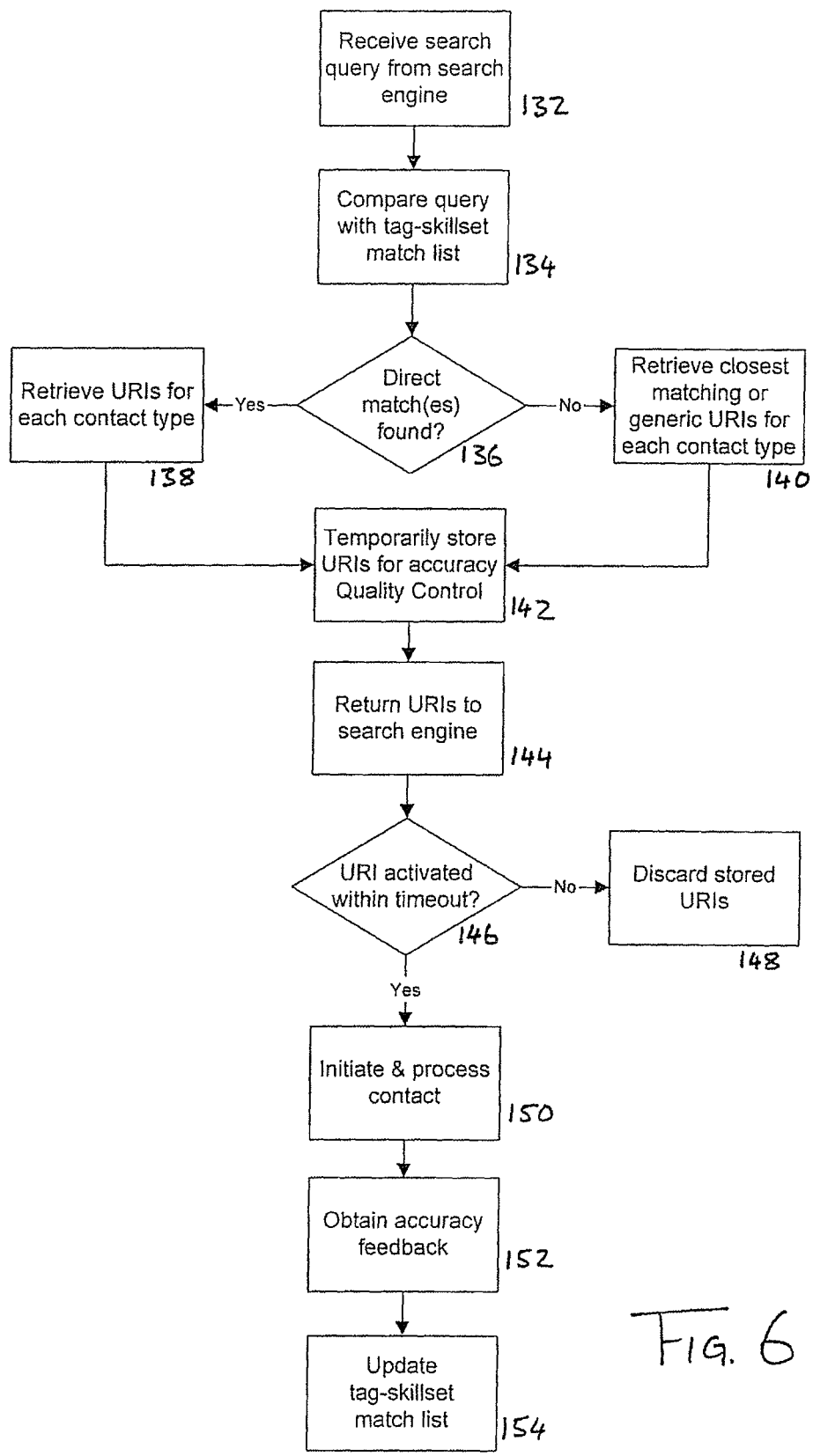
FIG. 6 is a flowchart of a method operating within a contact center system.

FIG. 6 is a flowchart of the corresponding process or method occurring at the contact center in correspondence with the search engine processes of FIGS. 4 and 5.

Upon receiving a search query from a search engine, step 132, the query is compared with the tag-skillset match list, step 134.

If direct hits or matches are found for one or more terms in the search query (or more accurately in the request sent by the search engine based on the search query), then a decision 136 is positive, and the URI generation process 52 of FIG. 1 receives appropriate URIs for initiating communications sessions for each possible type of contact (e.g. voice, video, IM). If more than one skillset is found to be relevant, then multiple URIs may be returned for each skillset match in step 138.

Alternatively, if the tag-skillset match list does not indicate any direct matches with the request received from the search engine, the closest matching, or even one or more generic URIs for generic queries, are retrieved in step 140.

Whichever URIs are provided by the generator, these are temporarily stored for later analysis by the accuracy quality control process 54 (FIG. 1), step 142. The URIs are returned to the search engine by search engine interface 48, step 144, and then a process timer waits to determine from the communications servers 34, 36, 38 in co-operation with the contact center management system 40, whether one of the returned URIs is activated within a predetermined timeout period, decision 146. It will be recalled that there are several diverse ways of determining whether a URI has been activated, including providing unique URIs, including an identifier of the user in the URI, and so on. If none of the URIs is activated within a timeout period (which in most instances can be set to be a relatively short period of time such as ten seconds or thirty seconds or two minutes), the stored URIs are discarded by the accuracy QC process, step 148.

If, on the other hand, a URI is activated within the timeout period, then the resulting communications session received at one of the communications servers is notified to the contact center management system 40 as previously described, and any parameters identifying the user, the search request or the returned skillsets are passed to the contact center management system which initiates and processes a contact 42, step 150.

Either at this stage, or later, following agent feedback, the accuracy QC process may be provided with an indication from the contact center management system or from an agent workstation as to the accuracy of the URIs generated earlier in the process, step 152. The accuracy QC process determines whether a particular URI provided to the user was a good match or a bad match, or whether a better URI could have been provided to the user based on the outcome of the communications sessions, and the accuracy QC process updates the tag-skillset match list to provide improved matching between the optimum URI, as determined by the feedback, and the original search query entered by the user, step 154. This can be done by increasing the weighting provided to a particular correlation between search query terms (or "tags") and skillsets, or by adding new entries to the tag-skillset match list, or by deleting a relationship from that list, to give just three examples. As the skilled person will be aware, semantic matching techniques are continually being improved and any such method may be employed by the accuracy QC process to provide better and more targeted responses to future requests received from the search engine.

The invention is not limited to the embodiment(s) described herein but can be amended or modified without departing from the scope of the present invention.

We claim:

1. A computer-implemented method of providing a user's computer system with access to a resource of a contact center, comprising the steps of:
    (a) serving, by a search engine system, a search engine graphical user interface to the user's computer system for searching for information on one or more websites;
    (b) receiving, by the search engine system, a search query from the user's computer system via said graphical user interface;
    (c) sending, by the search engine system, a request based on said search query, to the contact center;
    (d) receiving, by the search engine system from the contact center in response to said request, data enabling a contact center link comprising an indicator of a network address to be provided to said user, wherein said contact center link, when activated by said user's computer system, initiates a voice or video telephony session between the user's computer system and a predetermined queue of agents of the contact center selected in response to said request, wherein the user's computer system was not participating in a telephony session with the contact center before activation of the contact center link; and
    (e) returning, by the search engine system, said contact center link to said user's computer system as part of a response to said search query.

2. A computer-implemented method as claimed in claim 1, further comprising the steps of:
    conducting, by the search engine system, a search of a search index database for one or more documents on the one or more websites in response to said search query, and
    returning at least one document link to one of said one or more documents as part of said response to said search query.

3. A computer-implemented method as claimed in claim 2, further comprising:
    formatting, by the search engine system, said response to said search query to display a first result set including said at least one document link and a second result set including said contact center link.

4. A computer-implemented method as claimed in claim 1, wherein said data received in step (d) enable a plurality of contact center links to be provided to said user's computer system.

5. A computer-implemented method as claimed in claim 1, wherein said data received in step (d) comprise said contact center link.

6. A computer-implemented method as claimed in claim 1, wherein said data received in step (d) comprise an identifier of a link cached by the search engine system.

7. A computer-implemented method as claimed in claim 1, wherein said contact center link is generated uniquely for said user's computer system, whereby activation of the contact center link initiates a voice or video telephony session recognisable by the contact center as relating to said request from said search engine system.

8. A computer-implemented method as claimed in claim 1, wherein said request sent to said contact center includes an identifier of said user's computer system, whereby said voice or video telephony session between the user's computer system and said predetermined queue of agents of the contact center arising from activation of said contact center link enables the contact center to associate said voice or video telephony session with said request from the search engine.

9. A computer-implemented method as claimed in claim 8, wherein said identifier of said user's computer system is a network address of said user's computer system.

10. A computer-implemented method as claimed in claim 1, wherein said contact center link when activated, initiates a voice or video telephony session between the user's computer system and a predetermined agent workstation of the contact center selected in response to said request.

11. A computer-implemented method as claimed in claim 1, wherein said contact center link is configured to initiate a voice or video telephony session from a compatible communications application on said user's computer system.

12. A computer-implemented method as claimed in claim 11, wherein said compatible communications application is a voice or video telephony application.

13. A computer-implemented method as claimed in claim 11, wherein said compatible communications application is integrated with a browser in communication with the search engine system.

14. A computer-implemented method as claimed in claim 1, wherein said contact center link contains parameters representing customer requirements which are passed to said contact center within a voice or video telephony session initiated on activation of said contact center link.

15. A computer-implemented method as claimed in claim 14, wherein said parameters are indicative of one or more skillset parameters employed by a management system of said contact center, whereby said voice or video telephony session may be directly assigned to a skillset based on the parameters.

16. A computer program product comprising:
a non-transitory computer readable storage medium having computer readable program code embodied therewith, the computer readable program code comprising:
(a) computer readable program code configured to serve a search engine graphical user interface to a user's computer system for searching for information on one or more websites;
(b) computer readable program code configured to receive a search query from the user's computer system via said graphical user interface;
(c) computer readable program code configured to send a request based on said search query to a contact center;
(d) computer readable program code configured to receive from the contact center, in response to said request, data enabling a contact center link comprising an indicator of a network address to be provided to said user's computer system, wherein said contact center link, when activated by said user's computer system, initiates a voice or video telephony session between the user's computer system and a predetermined queue of agents of the contact center selected in response to said request, wherein the user's computer system was not participating in a telephony session with the contact center before activation of the contact center link; and
(e) computer readable program code configured to return said contact center link to said user's computer system as part of a response to said search query.

17. A computer-implemented search engine system providing a user with access to a resource of a contact center, comprising:
a network interface to provide communication with the contact center; a computer readable storage medium storing instructions executable by a processor; the processor, in communication with the computer readable storage medium, wherein the processor when executing the executable instructions:
serves a search engine graphical user interface at a user's computer system for searching for information on one or more websites;
receives a search query from the user's computer system via said graphical user interface;
sends a request based on said search query to said contact center;
receives, from the contact center, data enabling a contact center link comprising an indicator of a network address, based on data received in response to said request, wherein said contact center link, when activated, by the user's computer system, initiates a voice or video telephony session between the user's computer system and a predetermined queue of agents of the contact center selected in response to said request, wherein the user was not participating in a telephony session with the contact center before activation of the contact center link; and
returns said contact center link to said user's computer system as part of a response to the search query.

18. A computer-implemented method of providing a user's computer system with access to a resource of a contact center, comprising the steps of:
(a) receiving, by a contact center system, from a search engine, a request based on a search query submitted to the search engine by the user's computer system;
(b) determining, by the contact center system from said request, an identity of at least one selected resource of the contact center based on stored rules;
(c) sending, by the contact center system, to the search engine, in response to said request, data enabling a contact center link comprising an indicator of a network address, to be provided to said user's computer system, whereby said contact center link, when activated by said user's computer system, will initiate a voice or video telephony session between the user's computer system and said at least one selected resource of the contact center, wherein the user's computer system was not participating in a telephony session with the contact center before activation of the contact center link;
(d) receiving, by the contact center system from said user's computer system, initiation of a voice or video telephony session from which said at least one selected resource may be identified; and
(e) directing, by the contact center system, said voice or video telephony session to said at least one selected resource.

19. A computer-implemented method as claimed in claim 18, wherein said data comprise an address of said at least one selected resource, whereby activation of the contact center link enables the user's computer system to initiate the voice or video telephony session directly with said at least one selected resource.

20. A computer-implemented method as claimed in claim 18, wherein said data comprise an identification, for inclusion in the contact center link to be returned to the user's computer system, of one or more skillset parameters employed by a management system of said contact center, whereby said voice or video telephony session may be directly assigned to a skillset based on the parameters.

21. A computer-implemented method as claimed in claim 18, wherein said data comprise a unique identifier, for inclusion in the contact center link to be returned to the user, said unique identifier being assigned to said request received from said search engine, whereby said voice or video telephony session may be associated with said request based on said unique identifier being communicated within said voice or video telephony session.

22. A computer-implemented method as claimed in claim 18, further comprising the step, carried out after having received initiation of said voice or video telephony session from the user's computer system, of amending, by the contact center system, the stored rules.

23. A computer-implemented method as claimed in claim 22, wherein the amendment of the stored rules confirms an association between the request received from the search engine and said at least one selected resource.

24. A computer-implemented method as claimed in claim 22, wherein the amendment of the stored rules confirms an association between the request received from the search engine and a resource of the contact center which is different from that specified in a contact center link activated by the user but to which said voice or video telephony session is ultimately directed.

25. A computer program product comprising:
a non-transitory computer readable storage medium having computer readable program code embodied therewith, the computer readable program code comprising:
   (a) computer readable program code configured to receive from a search engine a request based on a search query submitted to the search engine by a user's computer system;
   (b) computer readable program code configured to determine, from the request, an identity of at least one selected resource of a contact center based on stored rules;
   (c) computer readable program code configured to send to the search engine, in response to the request, data enabling a contact center link comprising an indicator of a network address, to be provided to the user's computer system, whereby the contact center link, when activated by said user's computer system, will initiate a voice or video telephony session between the user's computer system and the at least one selected resource of the contact center, wherein the user's computer system was not participating in a telephony session with the contact center before activation of the contact center link;
   (d) computer readable program code configured to receive, from the user's computer system, a telephony session initiation from which the at least one selected resource may be identified; and
   (e) computer readable program code configured to direct the telephony session to the at least one selected resource.

26. A computer-implemented contact center system for providing a user computer system with access to a resource of a contact center system, comprising:
   (a) a network interface to receive from a search engine a request based on a search query submitted to the search engine by the user's computer system and to send data to the search engine in response to the request;
   (b) a storage area storing rules for determining, from the request, an identity of at least one selected resource of the contact center based on stored rules; and
   (c) a processor programmed to determine the identity of said at least one selected resource of the contact center based on the stored rules and to generate data enabling a contact center link comprising an indicator of a network address to be provided to the user's computer system, whereby the contact center link, when activated by said user's computer system, will initiate a voice or video telephony session between the user's computer system and the at least one selected resource of the contact center, wherein the user's computer system was not participating in a telephony session with the contact center before activation of the contact center link;
wherein the processor is operably connected to the network interface to receive the request therefrom and to provide the data thereto.

* * * * *